Figure 3:
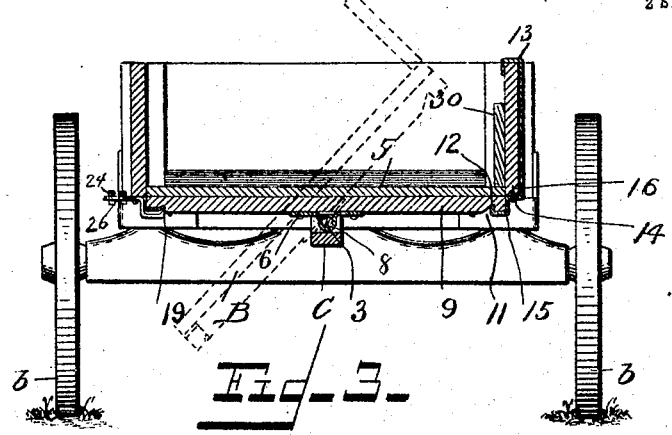

No. 795,578. PATENTED JULY 25, 1905.
T. R. CARSKADON.
DUMPING WAGON.
APPLICATION FILED SEPT. 17, 1904.
2 SHEETS—SHEET 1.
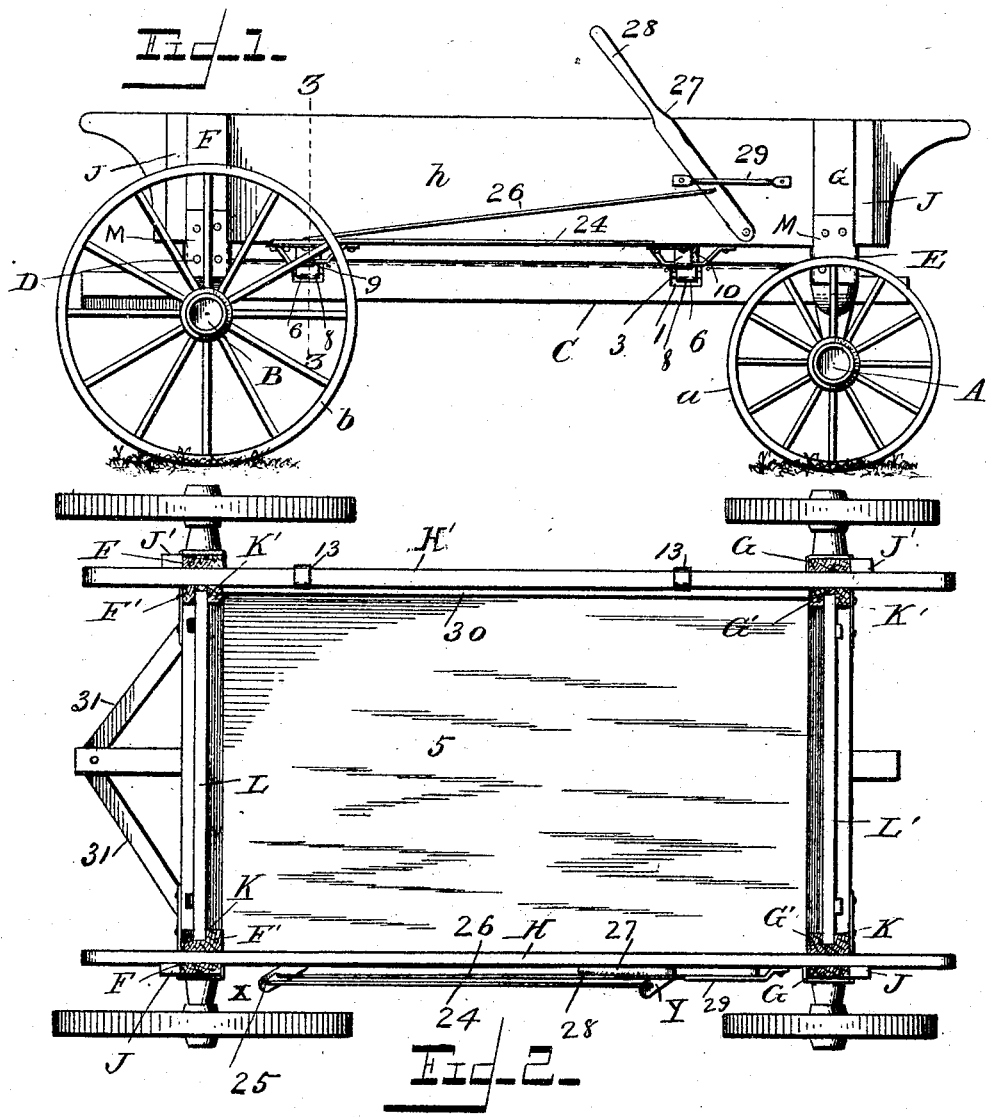
Witnesses
W. H. Durand
L. E. Barkley
Inventor
Thomas R. Carskadon,
By Frank A. Appleman
Attorney No. 795,578. PATENTED JULY 25, 1905.
T. R. CARSKADON.
DUMPING WAGON.
APPLICATION FILED SEPT. 17, 1904.

2 SHEETS—SHEET 2.

Witnesses
W. H. Ourand
L. E. Barkley

Inventor
Thomas R. Carskadon
By Frank Appleman
Attorney

UNITED STATES PATENT OFFICE.

THOMAS R. CARSKADON, OF KEYSER, WEST VIRGINIA.

DUMPING-WAGON.

No. 795,578.     Specification of Letters Patent.     Patented July 25, 1905.

Application filed September 17, 1904. Serial No. 224,797.

*To all whom it may concern:*

Be it known that I, THOMAS R. CARSKADON, a citizen of the United States of America, residing at Keyser, in the county of Mineral and State of West Virginia, have invented certain new and useful Improvements in Dumping-Wagons, of which the following is a specification.

This invention relates to wagons, and more particularly to that class known as "dumping-wagons."

An object of the invention is to produce a device of this kind that can be used not only as a dump-wagon, but effectually on all wagons of ordinary use in connection with grooved standards.

It is still further an object of the invention to produce such a device that is free from bulging—that is, the sides of the wagon are so constructed that they will not spread, and thereby permit the spilling of the contents of the wagon.

The invention also has for an object to provide a wagon having a dumping-bottom, the bottom being pivoted or fulcrumed to the reach of the vehicle, and thereby having a side movement.

Still further, an object of the invention is to produce in a device of this character means whereby the different parts of the vehicle-body receiving the greater strain are reinforced, and thereby made more effective.

Further, an object of the invention is to produce such a locking means for the movable bottom whereby the bottom is not only held in a closed position, but forces and holds the same into said closed position.

The invention also provides novel means whereby the locking mechanism is under control of a lever which is so positioned as to be of easy access by the driver of the vehicle when seated thereon.

Means are also provided in this invention whereby the turn of the front wheels of the vehicle is limited, and thereby prevents at any time the position of the said front wheels from interfering with the operation of the dumping-bottom.

Another object of the invention is to produce a suitable guard for the dumping-bottom whereby the contents of the vehicle are allowed to travel in but one direction, and thereby obviate the disadvantage of having the said contents from scattering about the place of dumping.

It is an object of the invention also to produce means whereby the strain on the reach-pole can be distributed, and thereby greatly increase the durability of the pole.

Further, an object of the invention is to produce a device of this character that will be simple and of few parts in construction, efficient and advantageous in practice, and economical to manufacture.

With the above and other objects in view the invention consists in the details of construction and in the arrangement and combination of parts to be hereinafter more fully described and claimed.

In describing the invention in detail reference will be had to the accompanying drawings, forming part of this specification, wherein like characters of reference will denote corresponding parts in the several views, and in which—

Figure 4:
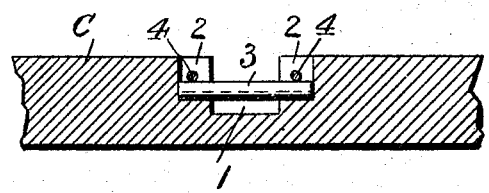
Figure 5:
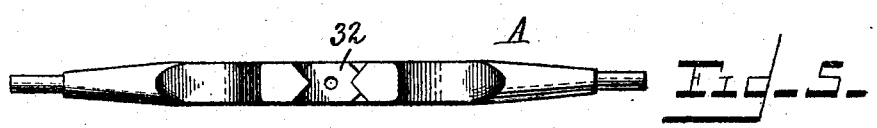
Figure 6:
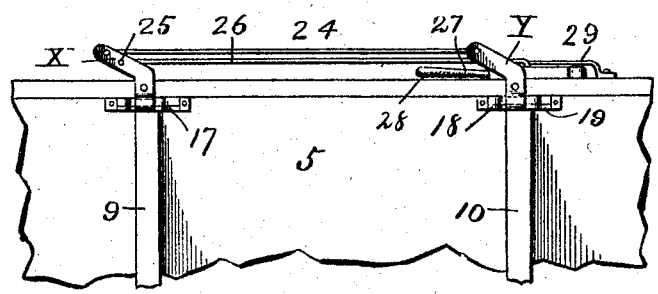

Figure 1 is a view in side elevation of a wagon embodying the invention. Fig. 2 is a top plan view thereof. Fig. 3 is a sectional view taken on the line indicated by the line 3 3 of Fig. 1. Fig. 4 is a fragmentary sectional view of the reach, showing in elevation a detail of the dumping mechanism. Fig. 5 is a top plan view of the front axle. Fig. 6 is a fragmentary bottom plan view of the vehicle or wagon body, showing the latching means. Fig. 7 is a view in perspective of one of the pivoted latches, illustrating its camming edge.

In the drawings, A indicates the front axle and *a* the wheels thereon. B indicates the rear axles and *b* the wheels thereon, and C indicates the reach-pole. It is to be noticed that the reach-pole C extends beyond both the front and rear axles.

D and E indicate end cross-strips suitably secured to the reach-pole C.

Extending upward from the end strips, at the ends thereof, are the parallel and spaced posts F F' and G G', between which the sides H H' are adapted to rest. These sides H H' are provided on their outer faces with the vertical strips J J', which are adapted to abut the outer faces of the posts F and G. By this arrangement the spreading of the sides is prevented. Ordinarily, these strips are provided as guides only, but in this device they not only act as guides for the insertion of the sides, but act as a stop for preventing the said sides from bulging or spreading, as can be easily and readily understood from the drawings. The inner faces of the posts F' and G' are provided with the vertical grooves K and K', which are adapted to receive the side edges of the end gates L and L'. In practice the strain at the point of junction between the posts and cross-strips is very great, and in order that the same may be reinforced and strengthened the metallic bands M are employed.

Suitably distanced from each end of the reach-pole and between the axles A and B is a recess or depression 1, having the oppositely-disposed pockets 2, in which the ends of a shaft or pin 3 are adapted to rest. In order that the shaft may be held within the pockets and the recess, removable pins 4 extend transversely through the reach C and the pockets 2 and are adapted to bear down upon the shaft 3.

A bottom 5 fits between the sides and ends of the vehicle. The bottom 5 has arranged on its under surface centrally of its width straps 6 of suitable metal. These straps are adapted to pass through the recesses 1 of the reach and engage the shafts 3 held therein. By this means the bottom is pivoted or fulcrumed to the reach-pole in such a manner as to allow a sidewise movement of the bottom. The strap may be secured to the bottom in any suitable manner, but it is preferable that it should be so attached as to form a loop 8, adapted to extend within a recess of the reach. Arranged on the under surface of the bottom and extending entirely thereacross are strips 9 and 10. One end of each of these strips is provided with a notch 11, said notch being approximately V-shaped and extending entirely across the strip. Each of the notches is adapted to receive an upturned portion 12 of a seat or seat for the bottom when in its normal or closed position. This support comprises a metal band bent at its upper portion 13 to fit over the top of the side H' of the vehicles. The opposite end portion is angular, as at 14, and terminates in the hook-like member 15, having the upturned portion 12. To hold the band in positive position, a nail, screw, or similar device 16 is passed through the angular portion 14 to engage the lower edge of the side H'. By having a support arranged in this manner the entire strain of the load on the seat is borne by the side H of the vehicle and not by any rivet, nail, &c., that is liable to become loosened or broken, and this arrangement of fastening not only provides a seat for the bottom when in its normal position, but holds the side H' from any lifting or upward movement and holds it in operative position. The opposite ends of the strips 9 and 10 are adapted to be engaged by the latches X and Y. Wear-straps 17 and 18 pass over the strips and are secured at their ends to the bottom. These straps are so arranged as to form an incline, whereby the latches X and Y can thereby force the bottom into a fully-closed position. After a load has been dumped and the bottom forced or thrown back into approximately its normal position it may be that from some cause it may not fully close. By this arrangement of straps on an incline the latches force it positively close before they lock. The inner edge of the strap is slightly depressed in order to form a seat 19 for the latches. The latches X and Y are pivoted intermediate their length to the under edge of the side H. These latches are in the form of a bell-lever and have the catch 20 formed on one end and are provided with the aperture 21 near the opposite end. The catch is approximately L-shaped and terminates in an upturned portion 22, which is provided with a cammed edge 23. The cammed edge of the catch engages the strap on one of the cross-strips of the bottom and further facilitates the closing of said bottom.

A link or rod 24 is fastened at either end to the latches X and Y through the apertures 21 therein. By this means a uniform movement is given said latches. The latch X is provided with a second aperture 25, in which is removably inserted an end of a lever or link 26, the opposite end of said link being pivoted intermediately of the length of a lever 27. This lever 27 is pivoted at its lower end to the forward portion of the side H, and the opposite end of the lever is formed into the handle portion 28. A stop-band 29 is attached to the side H in order that the movement of the lever in either direction is limited at a predetermined point. When the lever is at the limit of its movement in one direction, the latches are in a closed position, and thereby holding the bottom closed, but when at the limit of their movement in the opposite direction the latches are opened and the bottom is therefore free to drop. The link 26 is removably secured to the latch X, in that it may be easily applied to the brake-block, (not shown,) as in practice it may be desirable to obviate the dumping feature of the vehicle.

One edge of the bottom 5 is provided with the longitudinally upwardly extending flange or guard 30. This guard is on the edge of the bottom that moves upwardly in the dumping operation and is for the purpose of preventing the contents of the wagon from scattering, as can be easily understood, and to increase the weight of that side of the bottom, so that this predominating weight may be sufficient to automatically bring the bottom-latch into position for reloading.

In a dump-wagon constructed according to this invention the strain on the reach-pole C is very great. In order that this may be distributed, the braces 31 are provided. These braces are secured at one end to the axle B, near the ends thereof, and at their opposite ends to the portion of the reach extending beyond the axle.

If the movement of the front axle A upon its pivot or king bolt is not limited, the wheels

*a* thereof are liable to get beneath the drop-bottom and interfere with the operation thereof. To obviate this disadvantage, the reach also extends in front of the vehicle slightly and is adapted to rest within a recess or depression 32, arranged centrally of the upper edge of the axle. The opposing sides of the recess are cross-beveled in order that the axle may be free to swing a certain distance, the sides of the recess acting as a stop or limit. It will be further seen that where desired the bottom parts may be so hinged to the coupling pole or reach in the center that they may be disengaged from each side, and thus dump from each side as now they dump from one side.

The operation and construction of the device will be, it is thought, clearly apparent to those skilled in the art, it being observed that all changes may be made in the details of construction and in the arrangement of parts that fairly fall within the scope of the invention without departing from or sacrificing the value of the claims hereunto attached.

Having thus fully described my invention, what I claim as new, and desire to secure by Letters Patent, is—

1. In a device of the character described, a reach-pole and supporting means therefor, a frame supported by the reach, a bottom independent of the frame, and straps carried by the bottom by means of which the bottom is fulcrumed to the reach.

2. In a device of the character described, a reach-pole and supporting means therefor, said reach having a recess in one of its faces, a frame supported by the reach, a bottom independent of the frame and fulcrumed within the recess of the reach.

3. In a device of the character described, a reach-pole and supporting means therefor, said reach having recesses in one of its faces, a frame supported by the reach, a bottom independent of the frame and fulcrumed within the recesses of the reach, and a flange on one of the edges of the bottom.

4. In a device of the character described, a reach-pole having recesses and pockets to either side of the recess, shafts resting within the pockets and extending across the recess, and a bottom fulcrumed to the shafts.

5. In a device of the character described, a reach-pole, a frame supported thereby, a bottom for the frame fulcrumed to the reach, straps secured to the frame to form seats for the bottom, means for holding the straps in positive positions and means for holding the bottom in a closed position.

6. In a device of the character described, a reach-pole, a suitable frame supported thereby, a series of straps secured to one side of the frame to form seats, said straps being so arranged as to bear on the upper edge of the side, a bottom for the frame fulcrumed to the reach and adapted to rest on the seats formed by the straps and having its movement in one direction limited thereby and latches for holding the bottom in a closed position.

7. In a device of the character described, a reach-pole, a frame supported thereby, a bottom for the frame fulcrumed to the reach, seats carried by one side of the frame for the bottom and latches pivoted to the opposite side of the frame, said latches having a cammed edge adapted to engage the under surface of the bottom.

8. In a device of the character described, a reach-pole, a frame supported thereby, a bottom fulcrumed thereto, seats formed on one of the sides of the frame for the bottom, and straps secured to the opposite side of the bottom on an incline, and latches pivoted to the opposite side of the frame and adapted to engage the straps.

9. In a device of the character described, a reach-pole, a frame supported thereby, a bottom fulcrumed thereto, an axle pivoted to one end of the reach, and an axle secured to the opposite end of the reach, the said pivoted axle being provided with means whereby its movement is limited in order that it cannot interfere with the operation of the fulcrumed bottom.

10. In a device of the character described, a reach-pole having recesses, a frame supported thereby, a bottom for the frame fulcrumed in the recesses of the reach, and means for limiting the movement of the bottom in one direction.

11. In a device of the character described, a reach-pole, a frame supported thereby, a body fulcrumed thereto, an axle pivoted to the reach, an axle secured to the reach at its opposite portion, said pivoted axle having a recess through which the reach extends, the opposing sides of the recess being cross-beveled.

12. In a device of the character described, a reach-pole, a frame supported thereby, a bottom for the frame fulcrumed to the reach, means for limiting the movement of the bottom in one direction and latches for holding the bottom in said limited position, each of said latches being in the form of a bell-lever and pivoted to the frame having a catch on one end and an aperture in the opposite end, and a rigid connection between the latches engaging the apertures.

13. In a device of the character described, a reach-pole, a frame supported thereby, a bottom for the frame fulcrumed to the reach, cross-pieces on the under surface of the bottom having notches therein, straps secured to one side of the strap to form seats, said seats having upturned portions adapted to engage the notches of the cross-pieces and latches for engaging the bottom.

14. In a device of the character described, a reach-pole, a frame supported thereby, a bottom fulcrumed thereto, seats formed on one of the sides of the frame for the bottom, straps secured on the opposite side of the bottom and having an edge depressed, latches for engaging the straps and an upturned edge on each of the latches riding in the depression of the straps.

15. In a device of the character described, a reach-pole, a frame supported thereby, a bottom fulcrumed thereto, cross-pieces on the bottom, means for limiting the movement of the bottom in one direction, straps secured to the bottom and passing over the cross-pieces, and latches adapted to engage the straps.

16. In a device of the character described, a reach-pole, a front and back axle supporting the same, said reach extending a suitable distance beyond the rear axle, braces secured at one end to the outer portion of the reach beyond the rear axle and at their opposite ends near the ends of the rear axle, a frame supported by the reach and a bottom for the frame fulcrumed to the reach.

In testimony whereof I affix my signature, in the presence of two witnesses, this 15th day of September, 1904.

THOMAS R. CARSKADON.

Witnesses:
J. R. BEAN,
MAE DAVIS.